US006994746B2

(12) United States Patent
Aarts et al.

(10) Patent No.: US 6,994,746 B2
(45) Date of Patent: Feb. 7, 2006

(54) PREPARATION OF SATIN WHITE

(75) Inventors: Alois Johannes Gerardus Aarts, Ulestraten (NL); Jurgen Johannes Adrianus Broekman, Obbicht (NL); Jan Maria Joseph Thewissen, Meersen (NL); Geert Dijkstra, Boskoop (NL)

(73) Assignee: Ankerpoort, N.V., Maastricht (NL)

( * ) Notice: Subject to any disclaimer, the term of this patent is extended or adjusted under 35 U.S.C. 154(b) by 425 days.

(21) Appl. No.: 10/047,449

(22) Filed: Jan. 14, 2002

(65) Prior Publication Data
US 2003/0070586 A1 Apr. 17, 2003
(Under 37 CFR 1.47)

Related U.S. Application Data

(63) Continuation of application No. PCT/NL00/00498, filed on Jul. 14, 2000.

(30) Foreign Application Priority Data
Jul. 14, 1999 (NL) .............................. 1012597

(51) Int. Cl.
C09C 1/02 (2006.01)

(52) U.S. Cl. .................. 106/416; 106/437; 106/467; 524/198; 524/523

(58) Field of Classification Search ............... 106/416, 106/437, 467; 524/198, 523
See application file for complete search history.

(56) References Cited

U.S. PATENT DOCUMENTS

| 3,494,731 | A | * | 2/1970 | Reynolds ............. 423/518 |
| 3,563,700 | A | * | 2/1971 | Stiles et al. ........... 423/518 |
| 3,660,131 | A | * | 5/1972 | Murray et al. ......... 106/467 |
| 3,876,443 | A |   | 4/1975 | Conley et al. ......... 106/306 |
| 5,904,761 | A |   | 5/1999 | You ...................... 106/461 |

* cited by examiner

Primary Examiner—C. Melissa Koslow
Assistant Examiner—S. S. Manlove
(74) Attorney, Agent, or Firm—Banner & Witcoff, Ltd.

(57) ABSTRACT

The present invention relates to a process for preparing satin white, wherein aluminum sulfate and calcium hydroxide are brought together batchwise in a planetary kneader mixer and react to form satin white. The satin white obtained by the present process has a superior quality and can be prepared in a very efficient manner.

13 Claims, 1 Drawing Sheet

Figure 1
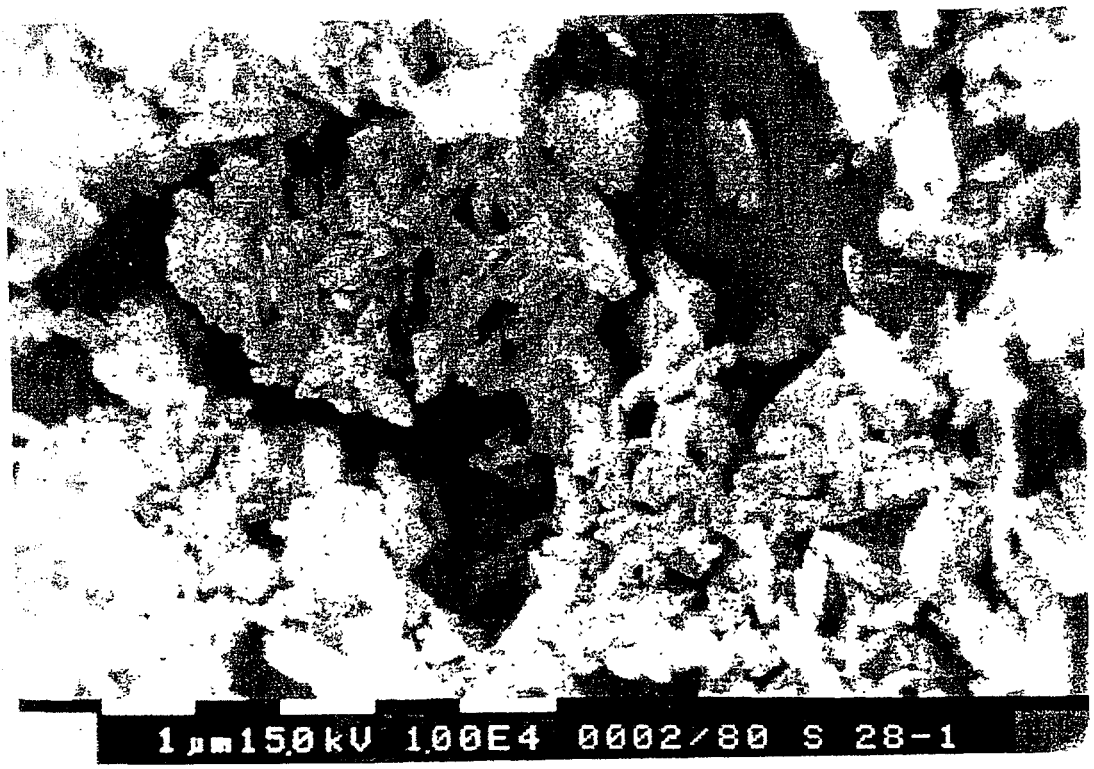
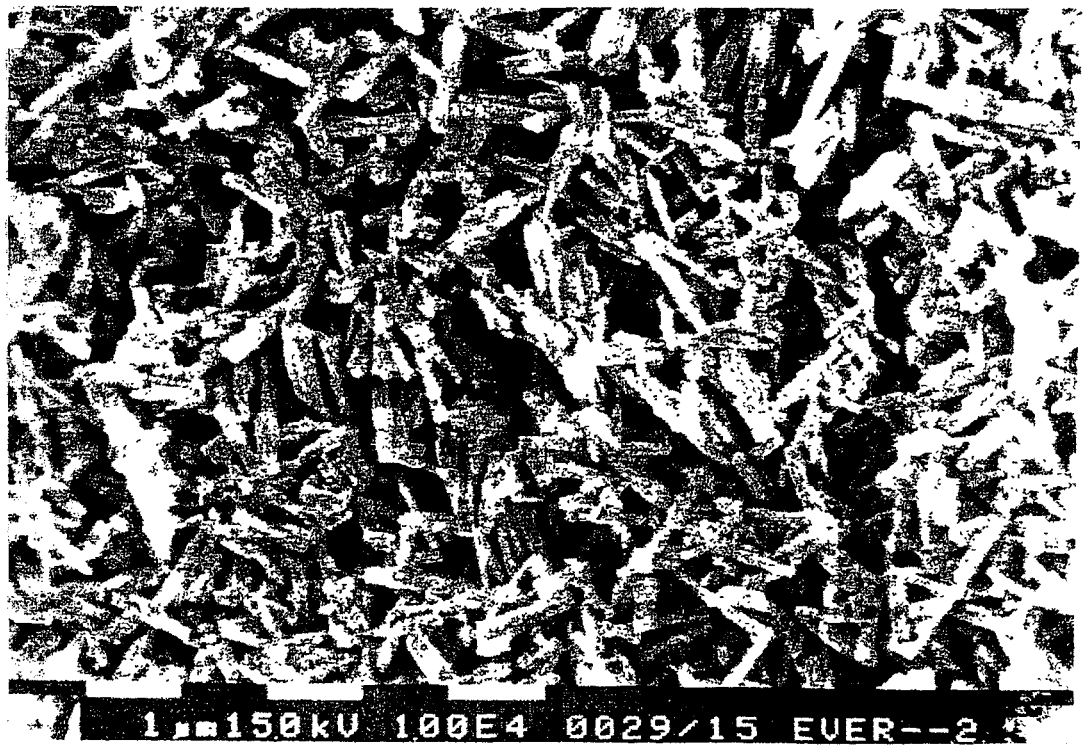
Figure 2

PREPARATION OF SATIN WHITE

This application is a continuation of prior international application number PCT/NL00/00498, filed on 14 Jul. 2000; which claims priority from Netherlands patent application number NL 1012597, filed 14 Jul. 1999.

This invention relates to a process for the preparation of satin white.

Satin white is a pure, white material which is used chiefly as a coating pigment for special coated paper and cardboard types. The structural formula of the material is $3CaO.Al_2O_3.3CaSO_4.32H_2O$.

On an industrial scale, satin white is prepared in a synthetic precipitation. A predetermined amount of a hydrated lime suspension ($Ca(OH)_2$) is brought together with a correspondingly adjusted amount of a solution of alum ($Al_2(SO_4)_3$) with vigorous mixing. This is done in a continuous process by means of metering pumps. The satin white paste thus obtained is transported in a reaction screw. In this reaction screw, the dwell time is about 20 minutes. Subsequently, the paste is dispersed with a sodium polyacrylate and adjusted to quality by grinding.

Although a great advantage of this known process is that it allows working with very high solids contents, so that a high efficiency is achieved, a number of disadvantages are associated with the preparation described.

The satin white obtained in the above preparation has a coarse particle structure, in which many irregular agglomerates are present. This has as a result that paper in which this satin white is incorporated as pigment does not have optimum gloss and printability.

The present invention has for its object the provision of a process for the preparation of satin white, which on the one hand allows working with high solids contents such as are known in conventional, continuous processes, and which on the other hand overcomes the disadvantages of the prior art. It is in particular an object of the invention that the satin white prepared as pigment in paper leads to an improved gloss and printability and moreover is of a very homogeneous quality.

Surprisingly, it has now been found that the stated objects are achieved by bringing the starting materials together while applying very high shearing forces with a specific apparatus and carrying out the preparation batchwise. Accordingly, the invention relates to a process for preparing satin white, wherein aluminum sulfate and calcium hydroxide are brought together batchwise in a planetary kneader mixer and react to form satin white.

According to the process of the invention, a satin white is obtained that has very good properties. It has been found that at least 95%, preferably at least 97%, of the satin white particles prepared have a size of not more than 2 $\mu$m. By virtue of this property, the satin white gives paper in which it is used as pigment a very high gloss and printability. It has further been found that the product has a very homogeneous quality and is very stable.

It has been found possible, in a process according to the invention, during the preparation to work with solids contents of more than 35% by weight, based on the weight of the reaction mixture, so that an economically highly profitable process is provided. It is preferred to work with a solids content between 45 and 55% by weight, based on the reaction mixture. These solids contents lead to an optimum in profitability and properties of the product.

The process according to the invention starts from aluminum sulfate and calcium hydroxide. Both are preferably used in the form of aqueous systems. The aluminum sulfate is preferably used in the form of an aqueous solution, the concentration of which may vary between 20 and 28% as $Al_2(SO_4)_3$. The calcium hydroxide is preferably used in the form of a slurry. This slurry will usually contain between 30 and 40% calcium hydroxide.

An important aspect of the invention is that the reactants mentioned are put together in a planetary kneader mixer. Although the reaction screw used heretofore exerts no inconsiderable shearing forces on the reaction mixture, still higher shearing forces are required according to the invention. The required higher shearing forces are achieved by making use of a planetary kneader mixer, which can transmit its energy to the reaction mixture in an efficient manner. During the reaction the speed of the planetary kneader mixer is preferably maintained between 15 and 200 r.p.m.

Preferably, in these apparatuses, additional provisions are made to increase the shearing forces still further. To be considered here are, for instance, the arrangement of partitions in the planetary kneader mixer. Thus, a better mixing is obtained, while at the same time the shearing forces are increased.

According to the invention, the reactants are put together in a planetary kneader mixer, where they are mixed while very high shearing forces are applied. During the mixing of the reactants a reaction takes place whereby the desired satin white is formed. The reaction time is typically between 10 and 45 minutes, preferably less than 30 minutes, still more preferably between 15 and 25 minutes. During the reaction, the temperature is preferably maintained between 15 and 45° C. The pH during the reaction is dependent on the amounts of the reactants in the reaction mixture.

The present process is carried out batchwise. It has been found that this leads to an extremely good product, while during the preparation work can be done with solids contents of about 50% by weight.

After completion of the reaction, preferably a dispersant is added. This is done in particular when the process is carried out batchwise, so that the product can be removed in a simple manner from the apparatus used. Suitable dispersants are used in an amount such that a slurry is obtained having a viscosity between 20 and 50 mPa.s (measured according to Brookfield LV and a spindle speed of 60 r.p.m. at 25° C.), substantially without this adversely affecting the properties of the satin white prepared.

Examples of suitable dispersants are gum arabic, soybean protein, casein, hydroxyethyl starch, carboxymethyl cellulose, polyacrylates, citrates, sulfonates and copolymers of maleic anhydride and styrene or a long-chain aliphatic hydrocarbon. These can be added in an amount of from 1 to 8% by weight, based on the reaction mixture.

As noted, the satin white prepared according to the invention possesses superior properties. This is largely due to the favorable particle size and particle size distribution of the product. Preferably, at least 95%, more preferably at least 97%, of the satin white particles formed have a size of less than 2 $\mu$m. This makes the satin white outstandingly suitable to be used as pigment in paper. In that application, the satin white imparts to the paper an excellent gloss and printability.

BRIEF DESCRIPTION OF THE DRAWINGS

In the course of the description of certain embodiments to follow, reference will be made to the attached drawings, in which, FIG. 1 is an electron microscopy photograph of the product of Example 1

FIG. 2 is an electron microscopy photograph of the product of Example 2

The invention will presently be further elucidated in and by the following examples.

EXAMPLE 1

A lime slurry having a solids content of 37.9% is continuously pumped by means of a metering pump, simultaneously with $Al_2(SO_4)_3$ content 8.10% $Al_2O_3$ via a metering pump, into a reaction machine. The lime slurry is metered at a rate of 788 kg/h and the $Al_2(SO_4)_3$ at a rate of 710 kg/h. The desired mole ratio of the satin white formed is then 7.1 to 1 and the solids content is 50% at 30° C. The speed of the reaction machine (Supratone) is 900 r.p.m. The satin white is continuously transported via the reaction machine into a plug flow reactor (with a screw). The screw mixes and transports the product. The speed of the screw is 31 r.p.m. The dwell time at a capacity of 1500 kg/h is about 20 min.

Next, the Supreme Satin White formed is dispersed with about 2–3% dispersant at a temperature of 50° C. Via an intermediate storage vat, the Supreme is de-agglomerated with a bead mill and prepared as end product. After a maturing period of 4–6 weeks and small viscosity corrections with the dispersant, the product can be used. An electron microscopy photograph of the product is represented in FIG. 1. Analytical data of the product are summarized in Table 1.

EXAMPLE 2

Into a planetary kneader mixer (Netsch, PMH90), per batch, 15.38 liters of water are pumped, and therein 9.52 kg of slaked hydrate are added and dispersed for 2 min at 600 r.p.m.

Next, in 20 seconds, 22.47 kg of $Al_2(SO_4)_3$ are added at 100 r.p.m. of the agitator (Butterfly). These substances react (knead) for 20 min in the double-walled kneading-and-mixing vessel, while the temperature is maintained at about 30° C. by cooling.

The desired and predetermined mole ratio $CaO/Al_2O_3$ is 7.10. The solids content is 50%. The satin white formed is dispersed with 2–3% dispersant (Dispex N40, Ciba Specialty Chemicals) for 5 minutes at 600 r.p.m. in the kneader mixer and via an intermediate storage with a mill adjusted to a final quality. During the maturing period of the DVP-S satin white, the viscosity can be adjusted with small amounts of dispersant.

An electron microscopy photograph of the product is represented in FIG. 2. It is clear to see that the homogeneity of the structure of the product is considerably better than that of the product obtained in Example 1 (FIG. 1).

Analytical data of the products are summarized in Table 1. The solids contents (at 30° C., 105° C. and 850° C., respectively) were measured according to ISO 787/2. The Hercules viscosity was determined according to Tappi T-648. The sieve residue was measured utilizing Nat 7. The particle size (D-50%) was measured by means of a Sedigraph, while the mole ratio was determined complexometrically. The specified whiteness values, finally, were determined according to, respectively, Tappi T-452 and Elrepho 3000 (Y-value and Cielab L).

TABLE 1

Analytical data of the products obtained in Examples 1 and 2

| Process | | | Example 1 Continuous | Example 2 Batch |
|---|---|---|---|---|
| Solids content | at 30° C. | in % | 50 | 50 |
| | at 105° C. | in % | 34.6 | 33.8 |
| Ash residue | 850° C. | in % | 27.4 | 27.1 |
| Hercules viscosity | 1000 rpm | mPa · s | 100 | 18 |
| Brookfield viscosity | 60 rpm | mPa · s | 28 | 28 |
| Sieve residue | <45 micron | in ppm | <100 | <100 |
| % <2 µm | | in % | 95 | 98 |
| % <1 µm | | in % | 83 | 97 |
| % <0.3 µm | | in % | 40 | 42 |
| % <0.2 µm | | in % | 20 | 24 |
| % <0.1 µm | | in % | 10 | 13 |
| D-50% | | in µm | 0.4 | 0.3 |
| pH | | | 13.1 | 13.2 |
| pH 10% | | | 12.8 | 12.9 |
| Mole ratio | $CaO/Al_2O_3$ | | 7.1 | 7.1 |
| Whiteness | T-452 | In % | 92 | 91 |
| | Y-value | In % | 94.1 | 93.5 |
| | Cielab L | | 97.7 | 97.2 |
| | a* | | 0.14 | 0.31 |
| | b* | | 1.2 | 1.43 |

EXAMPLE 3

The products obtained in Examples 1 and 2 are subsequently tested for their properties in a coating mixture for offset paper. To obtain a proper picture of the differences in properties between the product according to Example 1 and Example 2, these coating mixtures are tested with 7.5 and 15 parts of satin white in the formulation.

In this way, four different mixtures are obtained which are compared with each other for their gloss development and printability.

The following procedure was followed for this purpose:

First, the needed amount (60% by weight) of calcium carbonate (Hydrocarb 90; Omya Plüss Stauffer) slurry was initially provided. Then, with continuous stirring, 32.5% by weight and 25% by weight, respectively, of kaolin slurry (Amazon 88, Kaolin International) are added. After this, 0.5% by weight of dry sodium polyacrylate (Dispex N40, Ciba Specialty Chemicals) is added. This 0.5% by weight is calculated on total dry pigment. As last pigment, finally, 7.5% by weight or 15% by weight of the satin white are added. This mixture is stirred well for 10 minutes.

Thereafter, with stirring, 12% by weight of latex binder (Synthomer 72H10, Synthomer) are added. Then, respectively, 0.5% by weight of polyvinyl alcohol (Mowiol 4/98, Clariant), 0.5% by weight of carboxymethyl cellulose (Finnfix 5, Metsa Specialty Chemicals), 0.75% by weight of Calcium stearate (RG50, EKA Nobel), 1.0% by weight of optical whitener (Tinopal ABP, Ciba Specialty Chemicals) and finally 0.5% by weight of crosslinking agent (Bacote 20, MEL) are added. The mixture obtained in this way is stirred for 10 more minutes.

The different compositions are represented in Table 2.

TABLE 2

Compositions prepared in Example 3

| Ingredients | 1 | 2 | 3 | 4 |
|---|---|---|---|---|
| Hydrocarb 90, Omya | 60 | 60 | 60 | 60 |
| Amazon 88, Kaolin International | 32.5 | 25 | 32.5 | 25 |
| Extra Dispex, Ciba Specialty Chemicals | 0.5 | 0.5 | 0.5 | 0.5 |
| Product according to Example 1 | 7.5 | 15 | 0 | 0 |

TABLE 2-continued

Compositions prepared in Example 3

| Ingredients | 1 | 2 | 3 | 4 |
|---|---|---|---|---|
| Product according to Example 2 | 0 | 0 | 7.5 | 15 |
| Synthomer 72H10, Synthomer | 12 | 12 | 12 | 12 |
| Mowiol 4-98, Clariant | 0.5 | 0.5 | 0.5 | 0.5 |
| Ca Stearate | 0.75 | 0.75 | 0.75 | 0.75 |
| OBA, Tinopal ABP | 1 | 1 | 1 | 1 |
| Bacote 20, MEL | 0.5 | 0.5 | 0.5 | 0.5 |
| Brookfield viscosity RVT 100 rpm | 840 | 840 | 910 | 790 |
| Solids content at 30° C. | 62 | 62 | 62 | 62 |
| pH | 10.4 | 12.7 | 11.4 | 12.8 |

The coating mixture obtained is then applied with a so-called puddle blade coating unit at a speed of 50 meters per minute. The setting values for the coat weight are 9.5 and 11.5 grams per square meter. The coating mixture is applied to a 70 gram woodfree uncoated paper. The paper is calendered (4 nips, soft) at a temperature of 55° C. and a pressure of 125 kN/m. Also, the paper is dried in a gas oven at 125° C. and a steam oven at 60° C.

The coated papers obtained in this way are subsequently satinized and compared 10 with each other for properties listed in Table 3.

TABLE 3

Properties of paper prepared in Example 3

| | Mix no. | 1a | 1b | 2a | 2b | 3a | 3b | 4a | 4b | Paper |
|---|---|---|---|---|---|---|---|---|---|---|
| Coat weight at 6% moisture | | 11.5 | 9.6 | 11.5 | 9.6 | 11.5 | 9.6 | 11.7 | 9.7 | |
| Sheet gloss | 75° Sheen | 60 | 59 | 53 | 58 | 65 | 60 | 67 | 61 | |
| | s.d | 2.0 | 1.4 | 1.6 | 1.5 | 1.9 | 1.0 | 2.0 | 1.5 | |
| Smoothness PPS | Microns | 1.16 | 1.16 | 1.13 | 1.22 | 1.08 | 1.20 | 1.06 | 1.20 | |
| | s.d. | 0.04 | 0.05 | 0.02 | 0.03 | 0.04 | 0.04 | 0.06 | 0.03 | |
| R 457 Whiteness | 100% UV | 95.47 | 96.03 | 95.92 | 96.57 | 94.96 | 95.92 | 95.28 | 96.34 | 95.05 |
| | Yellowness | −10.77 | −11.74 | −10.80 | −12.09 | −9.87 | −11.74 | −10.28 | −11.93 | −13.00 |
| R 457 Opacity | % | 90.78 | 90.72 | 91.20 | 90.61 | 90.85 | 90.64 | 90.98 | 90.79 | 89.01 |
| Prüfbau dry pick | Ink 3803, 1.0 m/s 1000 N cm/sec | 83 | 68 | 77 | 61 | 68 | 68 | 67 | 65 | |
| Prüfbau wet pick | 1000 N, 3 sec dwell Ink 3802, 1 cm/sec % ID | 99 | 99 | 98 | 98 | 100 | 98 | 95 | 83 | |
| | Ink 3801, 1.5 cm/sec % ID | 95 | 80 | 96 | 91 | 88 | 82 | 83 | 66 | |
| Ink set rate | 10 secs | 104 | 95 | 110 | 107 | 112 | 98 | 109 | 97 | |
| | 20 secs | 65 | 52 | 71 | 64 | 74 | 56 | 67 | 53 | |
| | 30 secs | 32 | 2229 | 38 | 38 | 47 | 31 | 38 | 32 | |
| | 40 secs | 23 | 20 | 27 | 24 | 34 | 22 | 30 | 22 | |
| | Total | 224 | 196 | 246 | 233 | 267 | 207 | 244 | 204 | |
| Ink gloss 75° Sheen | 3 micron | 87 | 86 | 88 | 85 | 88 | 84 | 89 | 84 | |
| | 4 micron | 88 | 86 | 89 | 87 | 90 | 87 | 89 | 87 | |

What is claimed is:

1. A process for preparing satin white, wherein an aqueous solution of aluminum sulfate and a slurry of calcium hydroxide are brought together batchwise in a planetary kneader mixer and react to form satin white, wherein the solids content during the reaction is at least 35% by weight, based on the weight of the reaction mixture.

2. A process for preparing satin white, wherein an aqueous solution of aluminum sulfate and a slurry of calcium hydroxide are brought together batchwise in a planetary kneader mixer and react to form satin white, wherein the aluminum sulfate is added in the form of an aqueous solution having a concentration of 20 to 28%.

3. A process for preparing satin white, wherein an aqueous solution of aluminum sulfate and a slurry of calcium hydroxide are brought together batchwise in a planetary kneader mixer and react to form satin white, wherein the calcium hydroxide is added in the form of a slurry having a content of calcium hydroxide of from 30 to 40%.

4. A process according to claim 1, wherein a dispersant is added to the satin white.

5. A process according to claim 1, wherein the solids content during the reaction is between 45% and 55% by weight, based on the weight of the reaction mixture.

6. A process for preparing satin white, wherein an aqueous solution of aluminum sulfate and a slurry of calcium hydroxide are brought together batchwise in a planetary kneader mixer and react to form satin white, wherein the planetary kneader mixer is operated at a speed of between 15 and 200 r.p.m.

7. A process according to claim 1, wherein the aluminum sulfate and calcium hydroxide react for between 10 and 45 minutes.

8. A process according to claim 1, wherein the aluminum sulfate and calcium hydroxide react for between 15 and 25 minutes.

9. A process according to claim 4, wherein the dispersant is added in an amount such that the satin white has a viscosity of between 20 and 50 mPa's, measured according to Brookfield LV with a spindle speed of 60 r.p.m. at 25° C.

10. A process according to claim 4, wherein the dispersant is selected from the group consisting of gum Arabic, soybean protein, casein, hydroxyethyl starch, carboxymethyl cellulose, polyacrylates, citrates, sulfonates, and copolymers of maleic anhydride and styrene or long-chain aliphatic hydrocarbon.

11. A process according to claim 4, wherein the dispersant is added in an amount of from 1% to 8% by weight, based on the reaction mixture.

12. A process according to claim 1, wherein the aluminum sulfate and calcium hydroxide are reacted at a temperature of between 15 and 45° C.

13. A process according to claim 1, wherein the aqueous solution of aluminum sulfate and the slurry of calcium hydroxide react to form satin white particles, at least 95% of which have a size of less than 2 $\mu$m.

* * * * *

UNITED STATES PATENT AND TRADEMARK OFFICE
CERTIFICATE OF CORRECTION

| | | |
|---|---|---|
| PATENT NO. | : 6,994,746 B2 | Page 1 of 2 |
| APPLICATION NO. | : 10/047449 | |
| DATED | : February 7, 2006 | |
| INVENTOR(S) | : Alois J.G. Aarts et al. | |

It is certified that error appears in the above-identified patent and that said Letters Patent is hereby corrected as shown below:

Column 6, line 11, the number "10" should be deleted so that the line should read --satinized and compared with each other for properties--.

Column 6, Table 3, the number "53" in column 2a, row '75° Sheen' should read --63--.

Column 6, Table 3 should be formatted as follows on attached page 2:

Signed and Sealed this

Twenty-seventh Day of February, 2007

JON W. DUDAS
*Director of the United States Patent and Trademark Office*

TABLE 3

Properties of paper prepared in Example 3

| Mix no. | 1a | 1b | 2a | 2b | 3a | 3b | 4a | 4b | Paper |
|---|---|---|---|---|---|---|---|---|---|
| Coat weight at 6% moisture | 11.5 | 9.6 | 11.5 | 9.6 | 11.5 | 9.6 | 11.7 | 9.7 | |
| Sheet gloss | | | | | | | | | |
| 75° Sheen | 60 | 59 | 63 | 58 | 65 | 60 | 67 | 61 | |
| s.d | 2.0 | 1.4 | 1.6 | 1.5 | 1.9 | 1.0 | 2.0 | 1.5 | |
| Smoothness PPS | | | | | | | | | |
| Microns | 1.16 | 1.16 | 1.13 | 1.22 | 1.08 | 1.20 | 1.06 | 1.20 | |
| s.d. | 0.04 | 0.05 | 0.02 | 0.03 | 0.04 | 0.04 | 0.06 | 0.03 | |
| R 457 Whiteness | | | | | | | | | |
| 100% UV | 95.47 | 96.03 | 95.92 | 96.57 | 94.96 | 95.92 | 95.28 | 96.34 | 95.05 |
| Yellowness | -10.77 | -11.74 | -10.80 | -12.09 | -9.87 | -11.74 | -10.28 | -11.93 | -13.00 |
| R 457 Opacity | | | | | | | | | |
| % | 90.78 | 90.72 | 91.20 | 90.61 | 90.85 | 90.64 | 90.98 | 90.79 | 89.01 |
| Prüfbau dry pick | | | | | | | | | |
| Ink 3803, 1.0 m/s 1000N cm/sec | 83 | 68 | 77 | 61 | 68 | 68 | 67 | 65 | |
| Prüfbau wet pick 1000 N, 3 sec dwell | | | | | | | | | |
| Ink 3802, 1 cm/sec %ID | 99 | 99 | 98 | 98 | 100 | 98 | 95 | 83 | |
| Ink 3801, 1.5 cm/sec % ID | 95 | 80 | 96 | 91 | 88 | 82 | 83 | 66 | |
| Ink set rate | | | | | | | | | |
| 10 secs | 104 | 95 | 110 | 107 | 112 | 98 | 109 | 97 | |
| 20 secs | 65 | 52 | 71 | 64 | 74 | 56 | 67 | 53 | |
| 30 secs | 32 | 2229 | 38 | 38 | 47 | 31 | 38 | 32 | |
| 40 secs | 23 | 20 | 27 | 24 | 34 | 22 | 30 | 22 | |
| Total | 224 | 196 | 246 | 233 | 267 | 207 | 244 | 204 | |
| Ink gloss 75° Sheen | | | | | | | | | |
| 3 micron | 87 | 86 | 88 | 85 | 88 | 84 | 89 | 84 | |
| 4 micron | 88 | 86 | 89 | 87 | 90 | 87 | 89 | 87 | |